United States Patent [19]
Yoshida et al.

[11] Patent Number: 5,977,669
[45] Date of Patent: *Nov. 2, 1999

[54] FASTENING MEANS FOR CONTACTING DC-OUTPUT TERMINAL WITH COOLING FIN IN AC GENERATOR

[75] Inventors: Ko Yoshida, Konan; Tamaki Suzuki, Obu; Yusuke Kawano, Chiryu, all of Japan

[73] Assignee: Denso Corporation, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/745,775

[22] Filed: Nov. 8, 1996

[30] Foreign Application Priority Data

Nov. 8, 1995 [JP] Japan ................................. 7-290181

[51] Int. Cl.$^6$ .......................... H02K 13/00; H02K 11/00
[52] U.S. Cl. .......................................... 310/68 D; 310/71
[58] Field of Search ................................. 310/68 D, 72, 310/71, 239; 363/141, 145

[56] References Cited

U.S. PATENT DOCUMENTS

| | | | |
|---|---|---|---|
| 4,293,788 | 10/1981 | Binder | 310/227 |
| 4,419,597 | 12/1983 | Shiga et al. | 310/68 D |
| 4,606,000 | 8/1986 | Steele et al. | 363/145 |
| 4,710,657 | 12/1987 | Ocken et al. | 310/62 |
| 4,843,267 | 6/1989 | Kaneyuki | 310/68 D |
| 4,926,076 | 5/1990 | Nimura et al. | 310/68 D |
| 5,453,648 | 9/1995 | Bradfield | 310/71 |

FOREIGN PATENT DOCUMENTS

| | | | |
|---|---|---|---|
| 3-4146 | 2/1991 | Japan | 310/68 D |
| 3-183336 | 8/1991 | Japan | 310/68 D |
| 5-176505 | 7/1993 | Japan | 310/68 D |
| 5-219703 | 8/1993 | Japan | 310/68 D |

OTHER PUBLICATIONS

Electronics Engineers' Handbook by Fink, 1975.

*Primary Examiner*—Nestor Ramirez
*Assistant Examiner*—K. Imayoshi Tamai
*Attorney, Agent, or Firm*—Pillsbury Madison & Sutro LLP

[57] ABSTRACT

A three-wave rectifying unit of an AC generator has a plus-side cooling fin, a minus-side cooling fin and a DC-output terminal. The DC-output terminal is made of a metal plate which is harder than the plus-side cooling fin to provide tight mechanical connection. The DC-output terminal, the plus-side cooling fin, a plus-side brush terminal and a plus-side terminal of a voltage regulator are fastened together and electrically connected by a screw which is screwed into a portion of the DC-output terminal.

12 Claims, 7 Drawing Sheets

FASTENING MEANS FOR CONTACTING DC-OUTPUT TERMINAL WITH COOLING FIN IN AC GENERATOR

CROSS REFERENCE TO RELATED APPLICATION

The present application is based on and claims priority from Japanese Patent Application No. Hei 7-290181, filed on Nov. 8, 1995, the contents of which are incorporated herein by reference.

BACKGROUND OF THE INVENTION

1. Field of the Invention

The present invention relates to an AC generator for supplying AC output power and DC output power, and particularly to a three-phase AC generator for a vehicle having a rectifying unit.

2. Description of the Related Art

In an AC generator having plus-side and minus-side cooling fins for the three-phase full-wave rectifying unit, the plus-side output terminal is fastened to the plus-side cooling fin by rivets, which are soldered to assure the electric connection thereof.

In JPA 5-219703, the plus-side cooling fin is connected to the plus-side output terminal by a bolt.

In JPY2 3-4146, a terminal plate, the plus-side output terminal, plus-side cooling fin, an insulator and the minus-side cooling fin are put together and fastened by a bolt and a nut, thereby electrically connecting the plus-side cooling fin to the plus-side output terminal.

In a common AC generator, a terminal of a brush unit and a terminal of a voltage regulator are mechanically fastened and connected by a bolt or the like to the plus-side cooling fin to supply the field coil disposed in the rotor with field current.

However, it is necessary to control the fastening force when such electric devices are connected to the plus-side cooling fin in order to prevent breakage of the thread of the female screw formed in the plus-side cooling fin. In addition the above mechanical connection limits the thickness and hardness of the cooling fin.

SUMMARY OF THE INVENTION

Therefore, the present invention has an object of providing an improved structure of the electrical connection of electric devices to the cooling fin.

According to a feature of the present invention, a rectifying unit has a plurality of plus-side rectifying elements, a plus-side cooling fin holding the plus-side rectifying elements, minus-side rectifying elements, a minus-side cooling fin holding the minus-side rectifying elements and a DC-output terminal connected to the plus-side cooling fin and one of the brushes; and the DC-output terminal is made of a conductive metal plate harder than the plus-side cooling fin and has a contacting portion in pressure contact with the plus-side cooling fin and the terminal of the brush.

Therefore, the cooling fins are made thin irrespective of the mechanical fastening force required for reliable electrical connection.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

An AC generator for a vehicle according to a first embodiment is described with reference to FIG. 1 to FIG. 5.

Figure 1A:
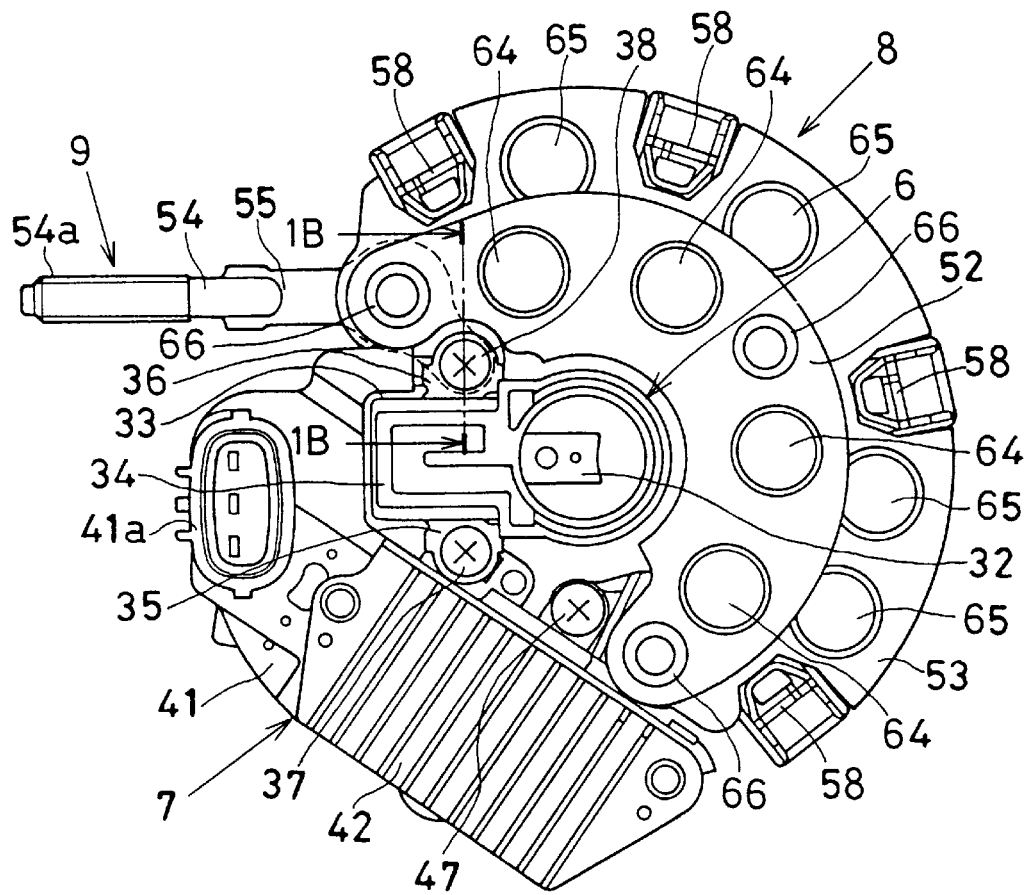
FIG. 1A is a plan view illustrating a brush unit, a voltage regulator and a three-phase rectifying unit according to a first embodiment of the present invention.
Figure 2:
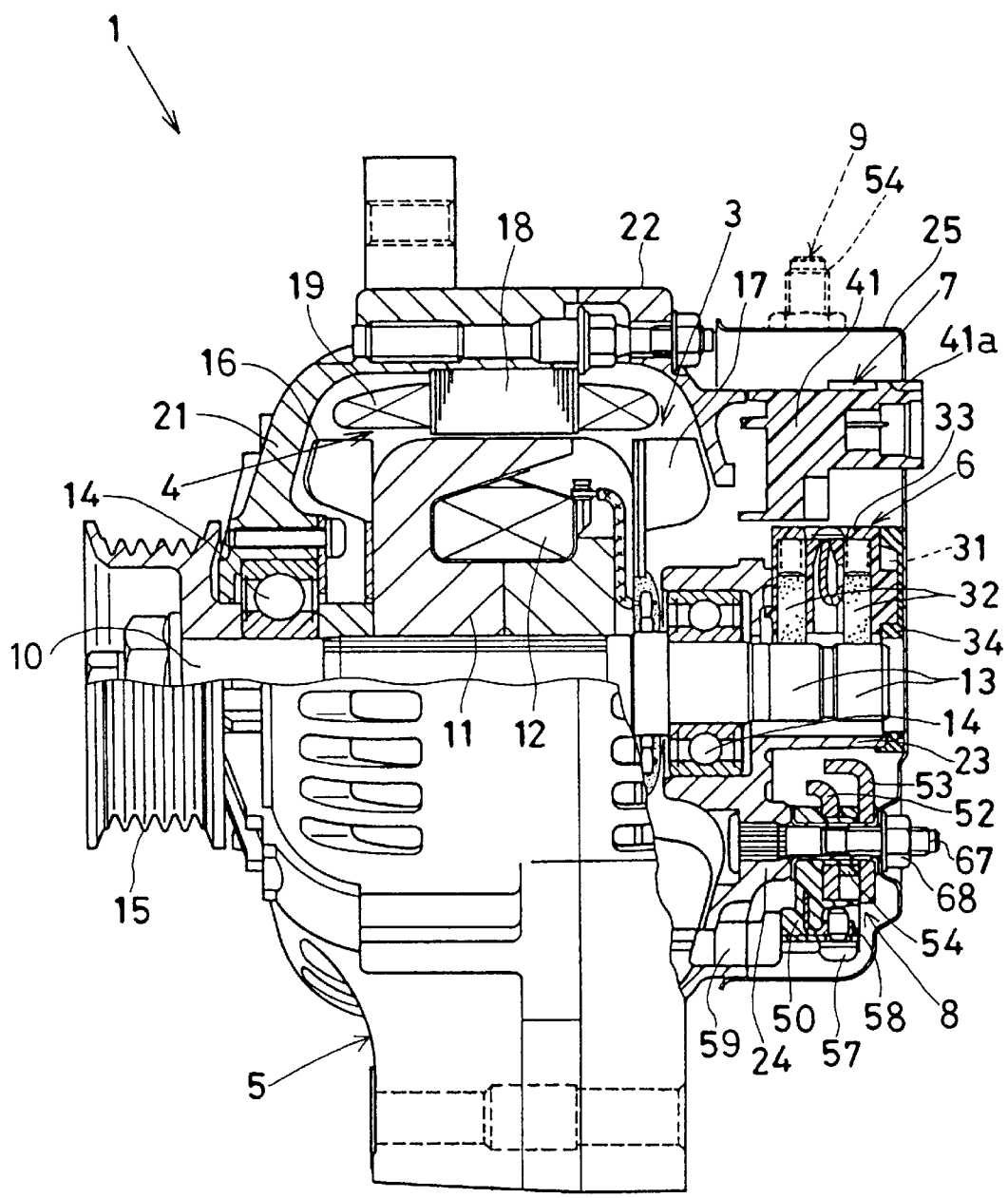
FIG. 2 is a cross-sectional side view illustrating an alternator for a vehicle according to the first embodiment.

An alternator 1, which is one of the AC generator, is composed of a rotor 3, a stator 4, a housing 5 accommodating the rotor 3 and the stator 4, a brush unit 6, a voltage regulator 7, a three-phase rectifying unit 8 and a plus-side DC-output terminal 9 as mainly shown in FIG. 1A and FIG. 2.

The rotor 3 has a shaft 10, a Lundell type pole core 11, a field coil 12 and two slip rings 13. The shaft 10 is rotatably supported by the housing 5 through a pair of bearings 14. A V-ribbed pulley 15 is fixed to an end of the shaft 10 to transmit the engine rotation through a poly-V belt. The pole core 11 has a pair of claw poles, and a pair of cooling fins are secured to claw poles at opposite ends of the pole core. The field coil 12 is wound around the central portion of the pole core, and the opposite ends are connected to the slip rings 13. The slip rings are carried by the rear end of the shaft 10.

The stator 4 has a stator core 18, which has a three-phase stator winding 19. The stator core 18 has numbers of slots to have the stator winding therein. The three-phase winding is composed of three coils connected in the Y-connection type (or Δ-connection type), and has coil ends connected to the three-phase rectifying unit 8.

The housing 5 is composed of a drive frame or front frame 21 and a rear frame 22. The drive frame 21 is made of aluminum die-cast and supports a bearing 14 of the front side. The rear frame 22 is also made of aluminum die-cast and supports the bearing 14 of the rear side. The drive frame 21 and the rear frame 22 are grounded through a bracket which is fixed to an engine and function as a minus-side DC terminal. A slip ring cover 23 is disposed inside the rear frame to cover the slip rings 13. The brush unit 6, the voltage regulator 7 and the three-phase-rectifying unit 8 are disposed along approximately the same circumference on the rear frame 22 and are fixed to three support portions 24 of the rear frame 22 together with the rear cover 25 by three bolts and nuts. The rear cover 25 is a press-formed aluminum plate and covers the brush unit 6, the three-phase rectifying unit 8, the voltage regulator 7 and the two slip rings 13.

The brush unit 6 has two carbon brushes 32, two springs for biasing the brushes against the slip rings 13, a brush holder 33 and a seal-packing 34. The brush holder 33 is made of an insulating material such as PPS and has a brush terminal 35 (hereinafter referred to as F-terminal) and a brush terminal 36 (hereinafter referred to as B-terminal), both of which are insert-molded therein. The seal-packing 34 is made of a rubber and seals a space defined by the slip ring cover 23, the brush holder 33 and the rear cover 25.

Figure 1B:
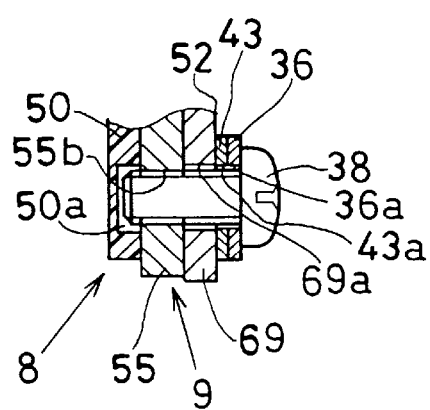
FIG. 1B is a cross-sectional view cut along a line indicated by arrows 1B—1B in FIG. 1A.

The F-terminal 35 is made of an iron plate and is fastened to a F-side terminal of the voltage regulator 7 by a screw 37 as shown in FIG. 1A. The B-terminal 36 is also made of an iron plate having a through hole 36a and is fastened to a B-side terminal 43 of the voltage regulator 7 together with the DC-output terminal 9 of the three-phase rectifying unit 8 by a screw 38 as shown in FIG. 1B.

Figure 3:
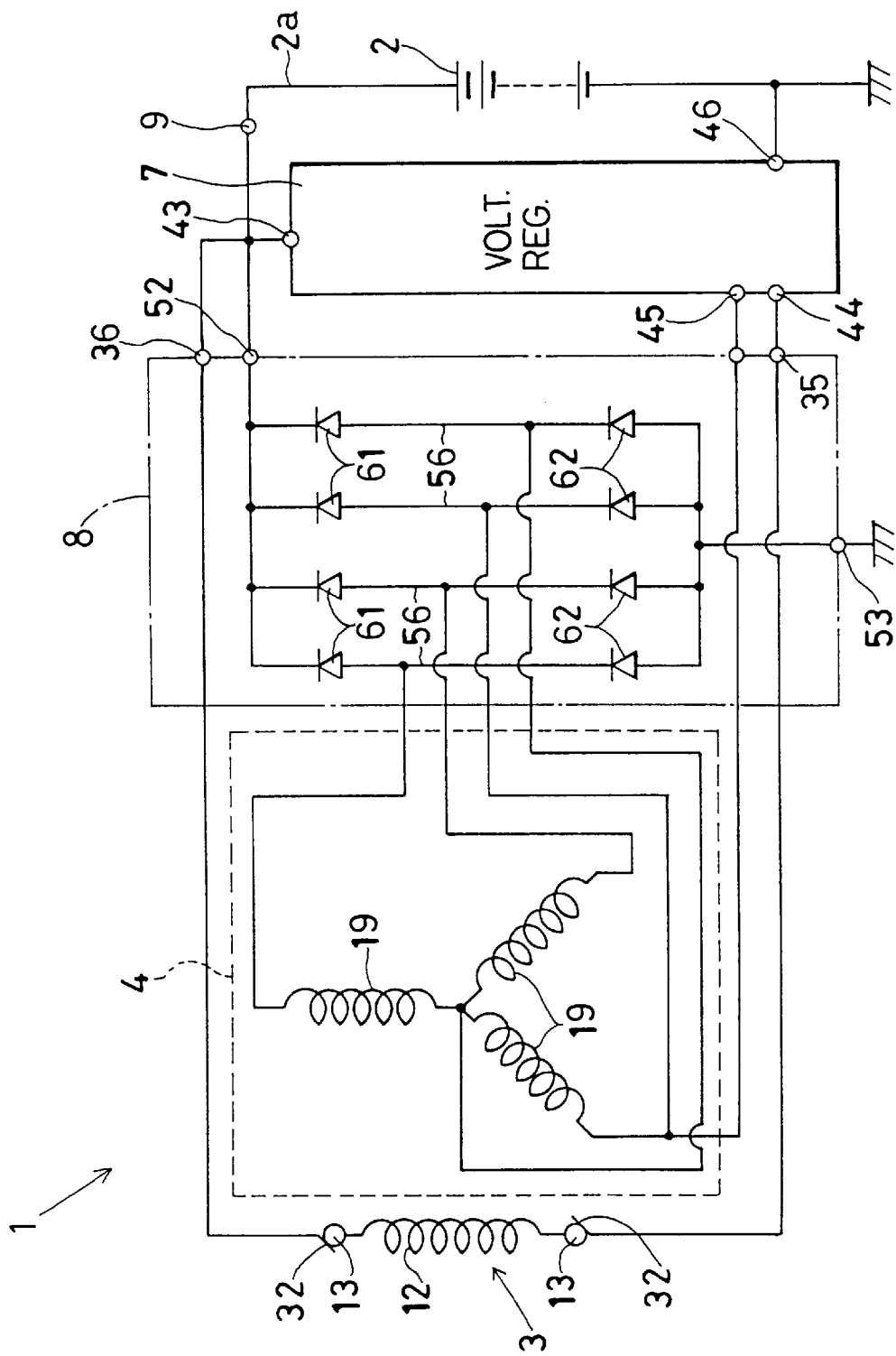
FIG. 3 is a circuit diagram of the alternator according to the first embodiment.
Figure 4A:
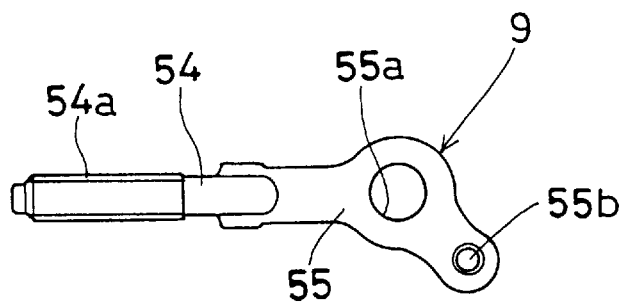
FIG. 4A is a plan view illustrating a DC output of the alternator according to the first embodiment.
Figure 4B:
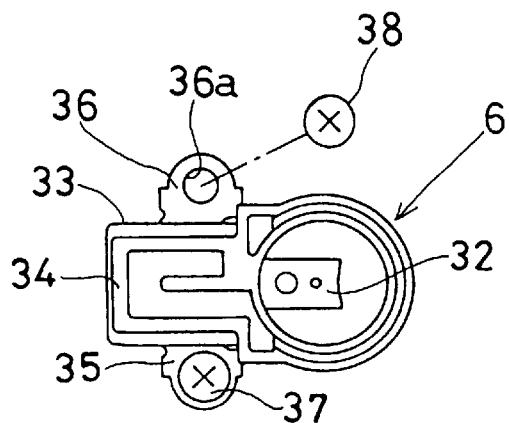
FIG. 4B is a plan view illustrating a brush unit of the alternator according to the first embodiment.
Figure 4C:
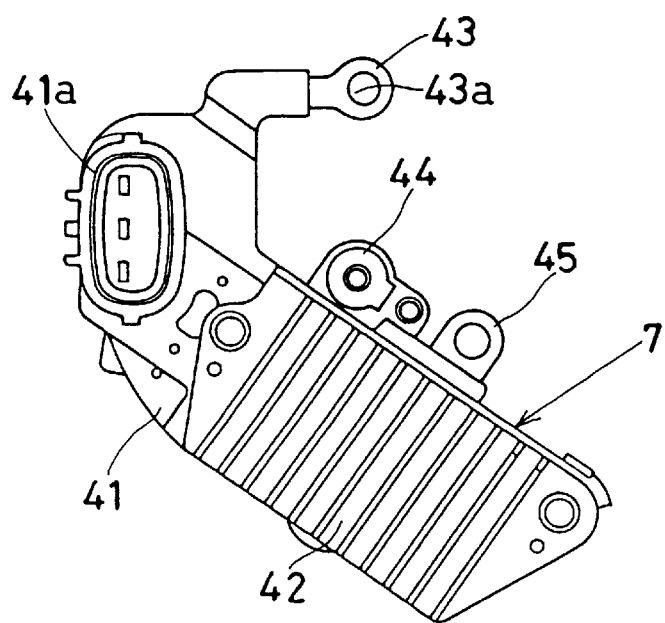
FIG. 4C is a plan view illustrating a voltage regulator of the alternator according to the first embodiment.

The voltage regulator 7 has a terminal unit 41 and a cooling fin 42. The terminal unit 41 is a mold of an insulating resinous material, which contains therein an integral circuit(not shown), a cylindrical male-connecter 41a for connecting the integral circuit to the outside, the B-side terminal 43, a F-side terminal 44, a P-side terminal 45 and an E-side terminal (earth terminal) 46 as shown in FIG. 3 and FIG. 4C. The cooling fin 42 is fastened to the rear frame 22 by a screw (not shown) with the terminal unit 41.

The B-side terminal 43 is made of an iron plate having a through hole 43a and is fastened together with the B-terminal 36 of the brush unit 6, the DC-output terminal 9 and a plus-side cooling fin 52 by the screw 38. The F-terminal 44 is made of an iron plate and is fastened to the F-terminal 35 of the brush unit 6 by the screw 37. The P-terminal 45 is fastened to an AC terminal of the rectifying unit 8 by a screw 47.

The rectifying unit 8 has the DC-output terminal 9, a terminal unit 50, three insulating spacers 51, the plus-side cooling fin 52 and a minus-side cooling fin 53.

The DC-output terminal 9 is made of an iron plate which is harder than the plus-side and minus-side cooling fins 52 and 53 which are made of copper or aluminum plates so as to assure tight connection by a screw (described later). The DC-output terminal 9 has a cylindrical rod portion 54 and a flat portion 55. The rod portion 54 has a screw thread 54a on the periphery thereof and is connected to the plus terminal of a battery 2 through a wire 2a as shown in FIG. 3. The flat portion 55 has a through hole for a pipe rivet 66 and a female screw 55b for the screw 38, as shown in FIG. 4A, and is fastened by the screw 38 together with the B-terminal 36 of the brush unit 6, the B-side terminal 43 of the voltage regulator 7, and the plus-side cooling fin 52 as described before. Thus, the DC-output terminal 9 and the plus-side cooling fin 52 are electrically connected through portions around the through hole 55a and the screw thread 55b. The DC-output terminal 9 is also connected electrically to the B-terminal 36 and B-side terminal 43 through a portion around the female screw 55b.

The terminal unit 50 is made of a tough insulating-resinous-material having the dimensional stability such as polyphenylen sulfide (PPS) and contains four AC terminals 56. The terminal unit 50 has a concave portion 50a which avoids interference with the screw 38 as shown in FIG. 1B. Each one of the four AC terminals 56 has a terminal plate 58 to connect one of the four coil ends of the Y-connected coils of the stator winding 19 by tightening a screw 57 shown in FIG. 2. The coil ends are insulated by a rubber bush 59 from the rear frame 22. The terminal unit 50 has cylindrical boss portions 60, and one of the three cylindrical insulating spacers 51, which is made of an insulating resinous material such as PPS, is fitted to the outer periphery of the boss portion 60 between the plus-side cooling fin 52 and the minus-side cooling fin 53.

Figure 5A:
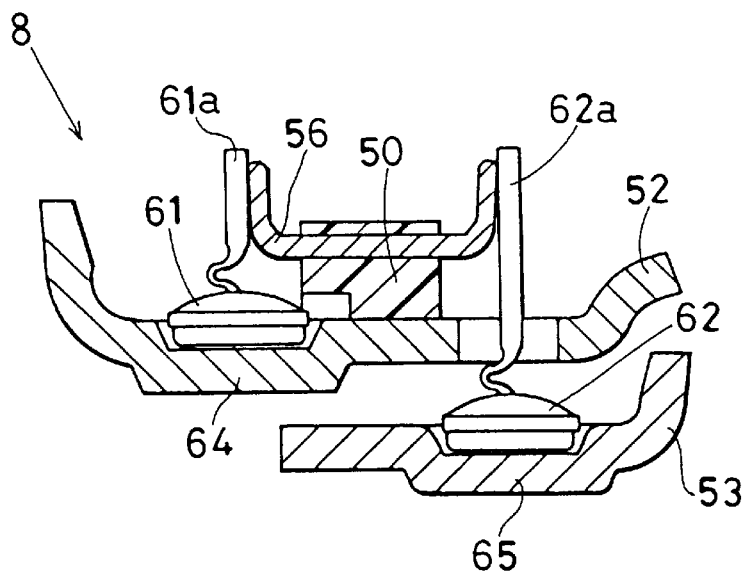
FIG. 5A is a cross-sectional side view illustrating a plus-side and minus-side diodes of the alternator according to the first embodiment.

The plus-side and minus-side cooling fins 52 and 53 are made of a heat conductive plate such as aluminum plate and formed into a C-shape respectively. They are disposed on the bottom of the rear frame around the brush unit 6 and hold the plus-side diodes 61 and the minus-side diodes 62 respectively thereon to dissipate heat of the diodes 61 and 62. The diodes 61 and 62 have lead terminals 61a and 62a at one side as shown in FIG. 5A, which are soldered to the AC terminals 56 respectively. They are connected to diode supports 64 and 65 of the plus-side and minus-side cooling fins 52 and 53 respectively at the other side.

Figure 5B:
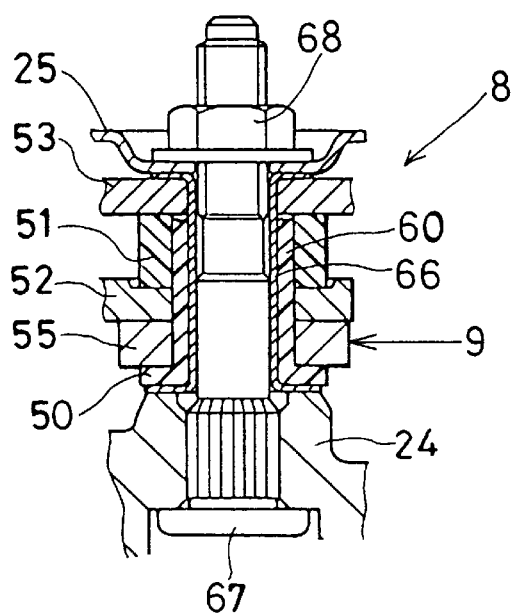
FIG. 5B is a cross-sectional side view illustrating a three-phase rectifying unit of the alternator according to the first embodiment fastened together with other members.

The plus-side and minus-side cooling fins 52 and 53 have three through-holes respectively. As shown in FIG. 5B, each of the three pipe rivets 66 inserted into each through-hole of both cooling fins 52 and 53 and each of the three boss portions 60 is inserted into each of the through holes of the plus-side cooling fin 52 as well as each of the three insulating spacers, which maintains the distance between both cooling fins 52 and 53.

The terminal unit 50, the spacers 51, the plus-side and minus side cooling fins 52 and 53 and the pipe rivets 66 are fixed to the support portions 24 of the rear frame 22 together with the rear cover 25 by bolts 67 and nuts 68. The plus-side cooling fin 52 has an integrally-formed terminal portion 69 at a radially inner portion thereof. The terminal portion 69 is fixed to the B-terminal 36, B-side terminal 43 and the flat portion 55 of the DC output terminal 9 by the screw 38. The terminal portion 69 has a through hole 69a for the screw 38 as shown in FIG. 1B. Thus, mechanical fastening force is not applied to the plus-side cooling fin 52 via the through hole 69a.

In assembling, the two springs 31 and the two brushes 32 having pigtails are put into the brush holder 33 and the pig tails are soldered to the F-terminal and B-terminal 35 and 36. Thereafter, the seal packing 34 is placed on the rear surface of the brush holder 33. The cooling fin 42 is placed on the terminal unit 41 and fastened to terminal unit 41 by a screw.

The terminal unit 50, the flat portion 55 of the DC-output terminal 9, the plus-side cooling fin 52 having the four diodes 61 and the minus-side cooling fin 53 having the four diodes 62 are put together and fixed by the three pipe rivets 66 with the three insulating spacers 51 interposed between the cooling fins 52 and 53 as shown in FIG. 5B and described before.

The flat portion 55 of the DC-output terminal 9, the terminal portion 69 of the plus-side cooling fin 52, the B-side terminal 43 of the voltage regulator 7 and the B-terminal 36 of the brush unit 6 are put together so as to align the concave portion 50a, the female screw 55b, the through hole 69a, the through hole 43a of the B-side terminal 43 and the through hole 36a of the B-terminal 36. They are fastened altogether by the screw 38 screwed into the female screw 55b as shown in FIG. 1B.

As shown in FIG. 1A and FIG. 4C, the F-terminal 35 of the brush unit 6 is electrically connected to the F-side terminal 44 of the voltage regulator 7 by fastening the screw 37, and the P-side terminal 45 of the voltage regulator 7 is electrically connected to one of the AC-terminals 56 of the rectifying unit 8 by fastening the screw 47.

The bolts 67 are inserted into the through holes of the rectifying unit 8 and the holes of the support portions 24 of the rear frame 22 and the rear cover 25, and the nuts 68 are driven to the bolts 67, thereby fastening the members of the rectifying unit 7 tightly as shown in FIG. 5B.

Then, four coil ends of the stator winding 19 extending from the bushes 59 are connected to the AC-input terminals 58 by tightening the screws 57.

When the engine rotation is transmitted through a belt to the V-ribbed pulley 15, the shaft 10 and the rotor 3 rotate together with the pole core 11 and the slip rings 13. The voltage regulator 7 supplies the field coil 12 through the brush unit 6 and the slip rings 13 with field current from the battery. As a result, the claw poles are magnetized to supply the magnetic field flux to the stator core 18 and the stator winding 19, thereby generating three-phase AC voltage. The AC-voltage is rectified by the rectifying unit 8 and converted into DC-voltage to charge the battery. The DC voltage is regulated by the voltage regulator 7 in a known manner.

Second Embodiment

Figure 6:
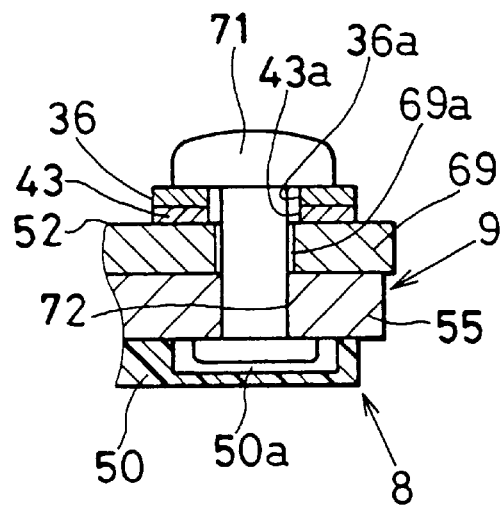
FIG. 6 is a cross-sectional side view of a main portion of a three-phase rectifying unit of an alternator according to a second embodiment of the present invention.

A second embodiment of the present invention is described with reference to FIG. 6.

In this embodiment, the flat portion 55, the terminal portion 69 of the plus-side cooling fin 52, the B-side terminal 43 of the voltage regulator 7 and B-terminal 36 of the brush unit 6 are fastened by a rivet 71. The female screw 55b of the flat portion 55 of the first embodiment is replaced with a through hole 72.

Third Embodiment

Figure 7:
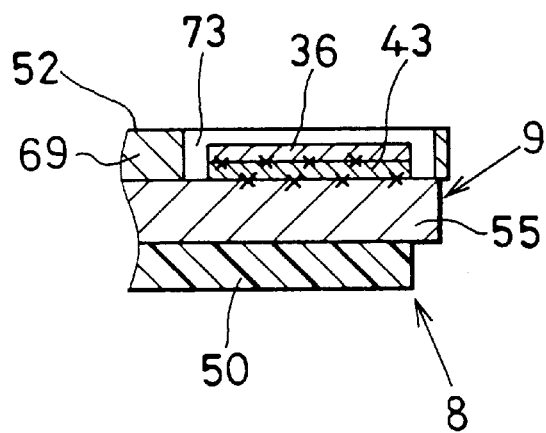
FIG. 7 is a cross-sectional side view illustrating a main portion of a three-phase rectifying unit of an alternator according to a third embodiment of the present invention.

A third embodiment is described with reference to FIG. 7.

In the third embodiment, the flat portion 55, the B-side terminal 43 and the B-terminal 36 are soldered or welded together by projection welding or the like, and the terminal portion 69 of the plus-side cooling fin 52 has an opening 73 for avoiding interference with the B-side terminal 43 and the B-terminal 36.

Fourth Embodiment

Figure 8:
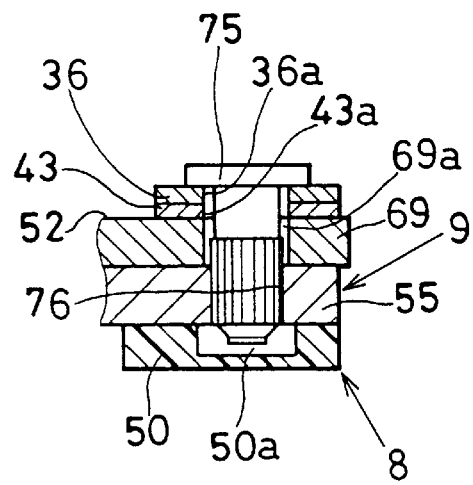
FIG. 8 is a cross-sectional side view illustrating a main portion of a three-phase rectifying unit of an alternator according to a fourth embodiment of the present invention.

A fourth embodiment is described with reference to FIG. 8.

In the fourth embodiment, the flat portion 55, the terminal portion 69 of the plus-side cooling fin 52, the B-side terminal of the voltage regulator 7 and B-terminal 36 of the brush unit 6 are fastened by a rivet 75 having a knurled portion.

The knurled portion is press-fitted into a through hole 76 formed in the flat portion 55.

Fifth Embodiment

Figure 9:
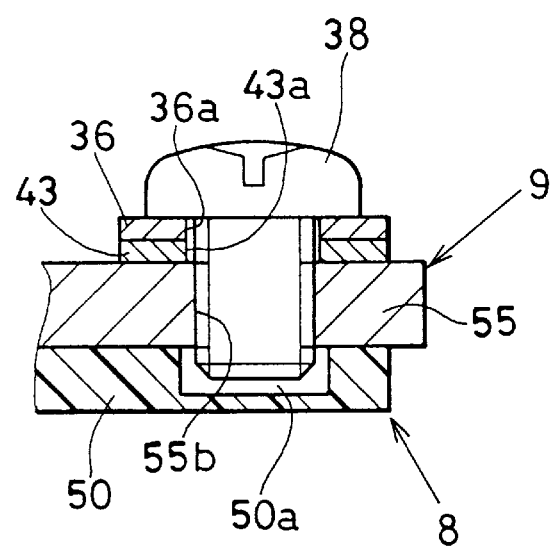
FIG. 9 is a cross-sectional side view illustrating a main portion of a three-phase rectifying unit of an alternator according to a fifth embodiment of the present invention.

A fifth embodiment is described with reference to FIG. 9.

In the fifth embodiment, the B-side terminal 43 and the B-terminal 36 are fixed to the flat portion 55 by the screw 38 and the DC-output terminal and the plus-side cooling fin 52 are connected together by another screw at another portion (not shown).

Variation

The DC output terminal 9 can be divided to two or more than two members. Either the B-terminal 36 of the brush unit or the B-side terminal 43 of the voltage regulator 7 can be connected to the DC-output terminal 9. The rectifying unit can have MOSFET-switching elements instead of the diodes 61 and 62. The voltage regulator 7 can be disposed outside the alternator 1. The three-phase rectifying unit 8 can be disposed inside the housing 5. The plus-side cooling fin 52 and the minus-side cooling fin 53 can be disposed on a same plane. This invention can be used for various generators other than the generator for a vehicle. In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An AC generator comprising:

a housing;

a rotor supported by said housing and having a field coil and two slip rings;

a stator supported by said housing and having a stator winding;

a brush unit having a brush terminal in contact with one of said two slip rings;

a rectifying unit having a plurality of plus-side rectifying elements, a plus-side cooling fin holding said plus-side rectifying elements, a plurality of minus-side rectifying elements, a minus-side cooling fin holding said minus-side rectifying elements and a terminal portion integral with said plus-side cooling fin;

a DC-output terminal made of a conductive metal having a hardness greater than that of which said plus-side cooling fin is made, said DC-output terminal having a contacting portion and a rod portion extending in a radially outward direction from said contacting portion, said contacting portion defining a first hole and a second hole spaced apart from each other;

first fastening means, disposed in said first hole, for mechanically connecting said contacting portion and said plus-side cooling fin, thereby maintaining a distance between said plus-side cooling fin and said minus-side cooling fin; and second fastening means, disposed said second hole, for mechanically and electrically connecting said contacting portion of said DC-output terminal, said brush terminal and said terminal portion of said plus-side cooling fin, wherein said first fastening means includes a member extending through said first hole, an insulating spacer disposed between said plus-side cooling fin and said minus side cooling fin, and said second fastening means includes a male screw and a female screw thread disposed at said second hole to provide electrical contact.

2. An AC generator as claimed in claim 1, further comprising a voltage regulator having a plus-side terminal, wherein
said contacting portion of said DC-output terminal is also in pressure contact with said plus-side terminal of said voltage regulator.

3. An AC generator as claimed in claim 2, wherein said DC-output terminal is made of iron plate.

4. An AC generator as claimed in claim 1, wherein said terminal portion of said plus-side cooling fin includes a through hole through which said male screw passes.

5. An AC generator as claimed in claim 1, wherein said first fastening means is a pipe rivet.

6. An AC generator comprising:
a housing,
a rotor supported by said housing and having a field coil and two slip rings;
a stator supported by said housing and having a stator winding;
a brush unit having a brush terminal in contact with one of said two slip rings, said brush terminal having a through hole formed therein;
a rectifying unit having a plurality of plus-side rectifying elements, a plus-side cooling fin holding said plus-side rectifying elements, a plurality of minus-side rectifying elements, a minus-side cooling fin holding said minus-side rectifying elements and a terminal portion integral with said plus-side cooling fin, said terminal portion having a through hole formed therein;
a DC-output terminal made of a conductive metal having a hardness greater than that of which said plus-side cooling fin is made, said DC-output terminal defining first and second holes spaced apart from each other;
a first fastener, disposed at said first hole, for securing said plus-side and minus-side cooling fins at a distance; and
a second fastener fixed to said second hole, said second fastener having a male screw that extends through said through hole of said brush terminal and said through hole of said terminal portion of said plus-side cooling fin and a female screw that is formed in said second hole of said DC-output terminal to fix said male screw to said DC-output terminal, said brush terminal and said terminal portion of said plus-side cooling fin
wherein said first fastener comprises a member extending through said first hole, an insulating spacer disposed between said plus-side cooling fin and said minus-side cooling fin.

7. An AC generator as claimed in claim 6, wherein said first fastener is a pipe rivet.

8. An AC generator including:
a housing;
a rotor supported by said housing;
a stator supported by said housing and having a stator winding;
a brush unit;
a regulator;
a terminal member connected to at least one of said brush unit and said regulator;
a rectifying unit having a plurality of plus-side rectifying elements, a plus-side cooling fin holding said plus-side rectifying elements, an insulating member, a plurality of minus-side rectifying elements and a minus-side cooling fin;
a DC-output terminal having a first contacting portion and a second contacting portion spaced apart from said first contacting portion in a radial direction of said stator, said first contacting portion having a through hole and said second contacting portion having a female screw;
a rivet member, disposed at said first contacting portion to extend through said DC-output terminal, said plus-side cooling fin, said insulating member and said minus-side cooling fin, said rivet member mechanically connecting said DC-output terminal, said plus-side cooling fin and said minus-side cooling fin; and
a male screw disposed at said second contacting portion, said male screw directly connecting said DC-output terminals, said terminal member and said plus-side cooling fin.

9. An AC generator as claimed in claim 8, wherein said rivet member comprises a pipe rivet.

10. An AC generator as claimed in claim 8, wherein said second contacting portion is disposed at a radially inner side of said first contacting portion.

11. An AC generator as claimed in claim 8, wherein said DC-output terminal is made of a conductive material having a hardness greater than that of said plus-side cooling fin.

12. An AC generator as claimed in claim 11, wherein said DC-output terminal is made of copper and said plus-side cooling fin is made of aluminum.

* * * * *